(12) United States Patent
Lin

(10) Patent No.: US 9,649,896 B1
(45) Date of Patent: May 16, 2017

(54) METHOD AND SYSTEM FOR TIRE PRESSURE MONITORING SYSTEM (TPMS) WITH WIRELESS TIRE CONDITION SENSING AND WARNING

(71) Applicant: Chung I Lin, Tainan (TW)

(72) Inventor: Chung I Lin, Tainan (TW)

( * ) Notice: Subject to any disclaimer, the term of this patent is extended or adjusted under 35 U.S.C. 154(b) by 0 days.

(21) Appl. No.: 14/986,614

(22) Filed: Dec. 31, 2015

(51) Int. Cl.
*B60C 23/04* (2006.01)
*B60R 25/32* (2013.01)
*G01M 17/02* (2006.01)

(52) U.S. Cl.
CPC ...... *B60C 23/0464* (2013.01); *B60C 23/0415* (2013.01); *B60C 23/0442* (2013.01); *B60C 23/0479* (2013.01); *B60C 23/0488* (2013.01); *B60R 25/32* (2013.01); *G01M 17/02* (2013.01)

(58) Field of Classification Search
CPC ............ B60C 23/0408; B60C 23/0416; B60C 23/0488; B60C 23/0444; B60C 23/045; B60C 23/0479; B60C 2019/004; B60C 23/0401; B60C 23/0406; B60C 23/0413; B60C 23/0418; B60C 23/0433; B60C 23/044; B60C 23/0452; B60C 23/0461; B60C 23/0489; B60C 23/0494; B60C 23/20; B60C 23/0447; B60C 23/0462; B60Q 1/2661; G01S 11/06; G01S 13/74; G01S 13/878; H04W 4/008; H04W 76/021; H04B 5/0056
USPC ............... 340/442, 447, 445, 438, 5.61, 3.5, 340/426.13, 426.25, 444, 572.1, 686.6, 340/901
See application file for complete search history.

(56) References Cited

U.S. PATENT DOCUMENTS

| | | | | |
|---|---|---|---|---|
| 5,109,902 | A * | 5/1992 | Kobayashi | B60C 9/18 152/209.7 |
| 6,445,287 | B1 * | 9/2002 | Schofield | B60C 23/0401 340/442 |
| 6,993,962 | B1 * | 2/2006 | Ko | B60C 23/0408 73/146.5 |
| 7,508,302 | B2 * | 3/2009 | Watabe | B60C 23/0416 340/438 |
| 7,791,461 | B2 * | 9/2010 | Oda | B60C 23/0408 340/442 |
| 8,319,616 | B2 * | 11/2012 | Girard, III | G01S 11/06 340/426.13 |
| 2003/0201882 | A1 * | 10/2003 | Moore | B60C 23/0408 340/445 |
| 2004/0044450 | A1 * | 3/2004 | Taguchi | B60C 23/0466 701/29.6 |

(Continued)

*Primary Examiner* — Fekadeselassie Girma
(74) *Attorney, Agent, or Firm* — Alexander Chen, Esq.

(57) ABSTRACT

The present invention disclosed herein is a tire pressure monitoring system (TPMS) with a time encoded wireless tire condition sensing device and warning signal, wherein each transmitter ID is assigned its own timing parameter through the controlling device wherein each timing parameter has a different time delay to prevent any launch time transmission overlap. Furthermore, when the main controller receives data from a transmitter indicating abnormal tire condition, the vehicle velocity information is recorded and vibration detection is activated to determine whether there is abnormal vibration and, therefore, whether to transmit vibration warning signal to the display unit and/or to the mobile device of the driver.

3 Claims, 3 Drawing Sheets

(56) References Cited

U.S. PATENT DOCUMENTS

| | | | |
|---|---|---|---|
| 2005/0040941 A1* | 2/2005 | Schofield | B60C 23/0401 340/442 |
| 2007/0090970 A1* | 4/2007 | Watabe | B60C 23/0416 340/901 |
| 2007/0156320 A1* | 7/2007 | Breed | B60C 23/0408 701/70 |
| 2007/0277602 A1* | 12/2007 | Heise | B60C 23/0413 73/146.5 |
| 2008/0216567 A1* | 9/2008 | Breed | B60C 11/24 73/146.5 |
| 2008/0252435 A1* | 10/2008 | Chien | B60C 23/009 340/438 |
| 2010/0164705 A1* | 7/2010 | Blanchard | B60C 23/041 340/442 |
| 2010/0295803 A1* | 11/2010 | Kim | G06F 3/0488 345/173 |
| 2011/0102138 A1* | 5/2011 | Girard, III | G01S 11/06 340/5.61 |
| 2011/0153469 A1* | 6/2011 | Mackenzie | G06Q 10/08355 705/28 |
| 2011/0304454 A1* | 12/2011 | Lickfelt | B60C 23/0418 340/447 |
| 2012/0029759 A1* | 2/2012 | Suh | G05B 19/042 701/29.4 |
| 2014/0172241 A1* | 6/2014 | Shima | B60C 23/0416 701/49 |
| 2014/0180527 A1* | 6/2014 | Kosugi | B60C 23/0416 701/29.4 |
| 2014/0265642 A1* | 9/2014 | Utley | H02J 1/06 307/151 |
| 2014/0368325 A1* | 12/2014 | Yu | B60C 23/0461 340/442 |
| 2015/0321640 A1* | 11/2015 | Hisada | B60R 25/34 340/426.2 |
| 2016/0016444 A1* | 1/2016 | Lammers | B60C 23/0416 701/29.6 |
| 2016/0127529 A1* | 5/2016 | Kim | H04M 1/6075 455/418 |
| 2016/0214621 A1* | 7/2016 | Baalu | B60W 50/08 |
| 2016/0283962 A1* | 9/2016 | Chan | G06Q 30/0222 |
| 2016/0343178 A1* | 11/2016 | Lesesky | B60C 19/00 |
| 2016/0366065 A1* | 12/2016 | Kazanchian | H04L 47/28 |
| 2016/0375733 A1* | 12/2016 | Lesesky | G06K 19/07758 340/442 |
| 2016/0381724 A1* | 12/2016 | Zakrzewski | H04W 8/26 370/312 |

* cited by examiner

METHOD AND SYSTEM FOR TIRE PRESSURE MONITORING SYSTEM (TPMS) WITH WIRELESS TIRE CONDITION SENSING AND WARNING

INCORPORATION BY REFERENCE

Field of Invention

The present invention relates to a tire pressure monitoring system (TPMS) with tire pressure detection and warning, and more particularly to a tire pressure monitoring system for providing synchronized recording of vehicle velocity and warning signal upon detection of abnormal tire condition and vibration.

Background

Motor vehicles are undoubtedly one of the most important transportation to modern society, and therefore safety issue regarding motor vehicles has become a major concern. For ensuring driving safety, tire air pressure, especially, plays an important factor of road safety. In particular, tire pressure is directly related to the safety of driving a vehicle. Improper tire pressure can lead to greater fuel consumption and inferior vehicle control, which threatens the safety of the drivers and the passengers.

When the tire pressure is too low, the friction between the road and the tire increases, which may result in drivers losing control of the vehicle. Under low tire pressure, the tire may even separate from the rims during high-speeding cornering leading to serious car accident. On the other hand, if the tire pressure is too high, the contact area between the tire and the ground is reduced, resulting in less friction. This will result in less traction which could lead to loss of control of the vehicle, which may lead to skidding and out of control. Additionally, a vehicle traveling at a high speed will increase the temperature of the tire, which may cause an already overinflated tire to burst or rupture. Therefore, some prudent drivers will check the tire pressure with a tire pressure gauge to make sure the tire pressure is within the appropriate range. However, such manual detection of tire pressure before each instance of driving is laborious and tedious. However, it is inconvenient when the driver has to manually check the tire pressure every single time.

To resolve this issue, the current industry practice is to install a pressure detector on the tires to constantly gather and report the information to the driver. When installing such detector, manufactures use a bolt and a gas nozzle to fix the detector inside the tire frame. While driving, the detector in each tire will send tire conditions such as pressure back to the central controller for the driver to review. This system is generally referred to as the tire pressure monitor system (TPMS). TPMS allows for the driver to constantly monitor the tire pressure of each tire in order to avoid flat tires and other dangerous circumstances.

A tire pressure monitoring system (TPMS) is an electronic system that is designed to monitor and provide real-time information of the air pressure of tires on various types of vehicles. The accurate measure of vehicle tire pressure while a vehicle is moving can prevent accidents and increase gas mileage. Government and university studies have cited the connection between tire under-inflation and vehicle crashes, including fatality rates. Furthermore, The accurate measure of vehicle tire pressure can increase the fuel efficiency of vehicles through reducing rolling resistance of the vehicles.

Generally, TPMS report the tire air pressure information via a gauge, a pictorgram display, or a simple low-pressure warning light. Furthermore, TPMS in use today are primarily either direct or indirect systems. Direct systems use a pressure sensor, either internally or externally, on each of the tires to directly measure tire pressure. Indirect systems use the ABS to derive the tire pressure by comparing the number of revolutions of each wheel while driving. The circumference of a tire with low pressure is slightly less than one with correct pressure. Therefore, the revolutions per mile of the low pressure wheel is greater and these increased revolutions can be used to detect a low tire pressure.

Indirect tire pressure systems have great appeal because they can be combined with an existing ABS. The ABS already measures the rotation of each wheel so adding an ABS based TPMS only involves modifying the ABS software and adding a warning light display to the instrument cluster.

Unfortunately, ABS indirect systems are very inaccurate. Since the decrease in circumference of tires with low pressure is very slight, a large pressure drop combined with a long driving distance must occur to trigger a low tire pressure warning. Also, if the pressure is simultaneously low in all four tires on a vehicle, no detection is possible because there is no differential wheel rotations to detect.

The performance of a direct TPMS is far superior. Since tire pressure is being measured directly, low pressure warnings can be made instantly and very accurately. Although more accurate, direct systems are much more expensive than indirect systems because new hardware must be added to the vehicle.

Moreover, essentially all modern direct TPMS are wireless systems. A pressure sensor and transmitter is placed inside the tire (typically mounted on the rim) and a receiver is mounted elsewhere on the vehicle. Most wireless systems operate at a frequency of 433 MHz or higher to obtain a large transmission range. Most systems also require a new stand-alone receiver although a few systems share the keyless entry system receiver that is installed on some luxury or higher tier vehicles.

After the tire pressure sensors are installed on each tire and have been in operation for some time, they may have clock rate or clock frequency errors, which will result in overlapping signals. When the main controller receives such overlapping signals, it will interfere with the calculation and resulting in erroneous information being provided to the driver.

The current wireless tire pressure detectors, such as Republic of China (ROC) Patent Publication No. 201,314, 187 "wireless tire pressure sensors to avoid duplication of data transfer method", mainly assigns each set of the wireless tire pressure sensors its own ID and a set of different wake-up-time parameters. When the wireless tire pressure sensor starts working, it first identifies the ID and uses the corresponding algorithm to calculate which wake-up-time parameter to select, and send the data after the wake up time ends. The reason for assigning different wake-up-time to each sensors is to avoid overlapping data at the receiver, which may cause missed or false information. In addition to the different wake-up-time for each wireless tire pressure sensor to transfer data, each sensor is also assigned different spacing time to avoid overlapping at the receiver.

Unfortunately, such wireless tire pressure detectors use manual tire pressure detectors that require drivers to check the detectors every time before driving the vehicle. Furthermore, since it uses different ID, wake-up-time and corresponding algorithm to avoid data overlapping at the receiver, each individual algorithm and wake-up-time will interfere with each other while functioning. As a result, the central controller cannot distinguish among the received information. Finally, after the tire pressure sensors are installed on each tire and have been in operation for some time, they may have clock rate or clock frequency errors, which will result in overlapping signals. When the main controller receives such overlapping signals, it will interfere with the calculation and resulting in erroneous information being provided to the driver.

In addition, high-speed tires in the current market generally does not have an inner tube, therefore, the tire is directly fitted onto a rim and in contact with the road. The tire is filled with air or nitrogen in order to provide elasticity and support to support a vehicle. However, such tires is more easily ruptured due to a variety of conditions, such as low tire pressure, high tire pressure, expired tire, tread wear, foreign object puncture, etc. The tire will become flat in a short period of time due to the weight of the vehicle and cause the rim to be in direct contact with the ground leading to reduce control of the vehicle and increased likelihood of serious bodily injuries.

Accordingly, in order to provide a tire pressure monitoring system with more accurate tire conditions, the present invention provides tire pressure monitoring system with wireless tire condition sensing for synchronized recording of vehicle velocity and warning mechanism to alert the driver of any abnormal tire conditions and vibration in real-time.

OBJECTIVE OF THE INVENTION

Accordingly, it is the object of this invention to provide a method and system for a tire pressure monitoring system wherein main controller can communicate with one or more tire sensors.

It is also the object of this invention to provide a method and system for a tire pressure monitoring system wherein the main controller and the sensors can communicate with one another wirelessly.

It is also the object of this invention to provide a method and system for a tire pressure monitoring system wherein the main controller and the sensors are synced with a time parameter to prevent signal interference.

It is also the object of this invention to provide a method and system for a tire pressure monitoring system wherein there is a synchronization function to prevent clock rate or clock frequency errors.

It is also the object of this invention to provide a method and system for a tire pressure monitoring system wherein the tire sensor can detect tire condition, such as tire pressure data, temperature data, centrifugal force data and battery voltage information.

It is also the object of this invention to provide a method and system for a tire pressure monitoring system wherein the main controller can display the condition on the display unit in the vehicle for the driver to review in the driver's convenient time.

It is also the object of this invention to provide a method and system for a tire pressure monitoring system such that it is simple to replace the tires, wherein the driver only needs to press the button on the new transmitter, and then the main controller will replace the old transmitter. The main controller's second micro-processing unit will match the old time parameter to the new transmitter, so the new transmitter will function immediately.

It is also the object of this invention to provide a method and system for a tire pressure monitoring system that is relatively inexpensive to manufacture, easily adoptable to current vehicles or tires, and is effective and efficient.

It is also the object of this invention to provide a method and system for a tire pressure monitoring system wherein the tire sensors can detect abnormal tire conditions automatically and in real-time.

It is also the object of this invention to provide a method and system for a tire pressure monitoring system wherein recording of vehicle velocity is synchronized to the detection of any abnormal tire condition.

It is also the object of this invention to provide a method and system for a tire pressure monitoring system wherein the vibration sensors can detect any abnormal vibration of the vehicle.

It is also the object of this invention to provide a method and system for a tire pressure monitoring system wherein a warning mechanism alarms the driver of the detection of any abnormal tire condition or vibration.

It is also the object of this invention to provide a method and system for a tire pressure monitoring system wherein a warning mechanism can alarm the driver through the in-vehicle display.

It is also the object of this invention to provide a method and system for a tire pressure monitoring system wherein a warning mechanism can alarm the driver through an application on a mobile device, thereby alerting the driver even when the driver is away from the vehicle while it is stationary.

It is also the object of this invention to provide a method and system for a tire pressure monitoring system wherein a warning mechanism can alarm the driver through an application on a mobile device, thereby alerting the driver of abnormal vibration and reducing the possibility of theft of the vehicle.

It is also the object of this invention to provide a method and system for a tire pressure monitoring system wherein a synchronized recording of vehicle velocity may be used to assist in the determination of liability in traffic accidents.

SUMMARY OF THE INVENTION

In another aspect of the invention, an apparatus for monitoring tire pressure comprising a main controller wherein the main controller is comprised of a second micro-processing unit, a second memory unit, a first receiver unit, a display unit, an operating unit, a second detection unit, a control switch, a second transmitter unit, and a master wireless transceiver unit; one or more tire transmitter wherein the tire transmitter is comprised of a first micro-processing unit, a first memory unit, a second receiver unit, a first transmitter unit, a second receiver unit, and a first detection unit.

In one embodiment, the apparatus further comprising a remote controller wherein the remote controller is comprised of a remote transceiver unit and a mobile device.

In one embodiment, the apparatus wherein the second detection unit is comprised of a vibration measurement unit.

In one embodiment, the apparatus wherein the master wireless transceiver unit and remote transceiver unit are comprised of radio frequency technology. In one embodiment, the apparatus wherein the master wireless transceiver unit is a low frequency radio transmitter a receiver unit and the remote transceiver unit is a low frequency radio transmitter and receiver unit. In one embodiment, the apparatus wherein the master wireless transceiver unit is a high frequency radio transmitter a receiver unit and the remote transceiver unit is a high frequency radio transmitter and receiver unit.

In one embodiment, the apparatus wherein the master wireless transceiver unit and remote transceiver unit are comprised of infrared frequency technology.

In one embodiment, the apparatus wherein the master wireless transceiver unit and remote transceiver unit are comprised of Bluetooth technology.

In another aspect of the invention, a method for monitoring tire pressure comprising providing a main controller wherein the main controller is comprised of a second micro-processing unit, a second memory unit, a first receiver unit, a display unit, an operating unit, a control switch, a second transmitter unit, and a master wireless transceiver unit; providing one or more tire transmitter wherein the tire transmitter is comprised of a first micro-processing unit, a first memory unit, a second receiver unit, a first transmitter unit, a second receiver unit, and a first detection unit; having the first micro-processing unit transmit a pairing signal via the first transmitting unit to the second micro-processing unit via the first receiver unit; performing a matching process on the pairing signal wherein the matching process is comprised of assigning a first time interval to the pairing signal; storing the pairing signal to the second second memory unit; transmitting the pairing signal back to the first micro-processing unit via the second transmitting unit to the second micro-processing unit via the second receiver unit at and storing pairing signal to the first memory unit; obtaining at least one data point of a tire by the first detection unit; transmitting the data point of a tire by the first micro-processing unit via the first transmitting unit to the second micro-processing unit via the first receiver unit at the time of transmission; synchronized retrieval and storing at least one data point of a vehicle by the main controller at second memory unit via the second micro-processing unit upon detecting the data point of a tire meeting one or more predetermined criterion.

In one embodiment, the method wherein the data point of a vehicle comprised of vehicle velocity.

In one embodiment, the method wherein the data point of a vehicle comprised of vehicle acceleration.

In another aspect of the invention, a method for monitoring vehicle vibration comprising providing a main controller wherein the main controller is comprised of a second micro-processing unit, a second memory unit, an operating unit, a second detection unit, a control switch, and a master wireless transceiver unit; providing a remote controller wherein the remote controller is comprised of a remote transceiver unit and a mobile device; obtaining at least one data point of a vehicle by the second detection unit;

In one embodiment, the method wherein the master wireless transceiver unit and the remote transceiver unit are comprised of radio frequency technology. In one embodiment, the method wherein the master wireless transceiver unit high frequency radio transceiver unit and the remote transceiver unit is a high frequency radio transceiver unit. In one embodiment, the method of wherein the master wireless transceiver unit low frequency radio transceiver unit and the remote transceiver unit is a low frequency radio transceiver unit.

In one embodiment, the method wherein the master wireless transceiver unit and the remote transceiver unit are comprised of infrared technology.

In one embodiment, the method wherein the master wireless transceiver unit and the remote transceiver unit are comprised of Bluetooth technology.

In one embodiment, the method wherein the mobile device via the remote transceiver unit transmits a signal to the master wireless transceiver unit to activate or terminates the second detection unit via the control switch.

In one embodiment, the method wherein the data point of a vehicle is vibration of the main controller and vibration of the vehicle.

In one embodiment, the method wherein the data point of a vehicle is transmitted by the second micro-processing unit via the master wireless transceiver unit to the remote controller via the remote transceiver unit. In one embodiment, the method wherein mobile device displays warning signal upon detecting the data point of a vehicle meeting one or more predetermined criterion.

BRIEF DESCRIPTIONS OF THE DRAWINGS

The accompanying drawings, which are incorporated herein and form a part of the specification, illustrate embodiments of the invention and, together with the description, further serve to explain the principles of the invention and to enable a person skilled in the relevant art to make and use the invention.

DETAILED DESCRIPTIONS OF THE INVENTION

Figure 1:
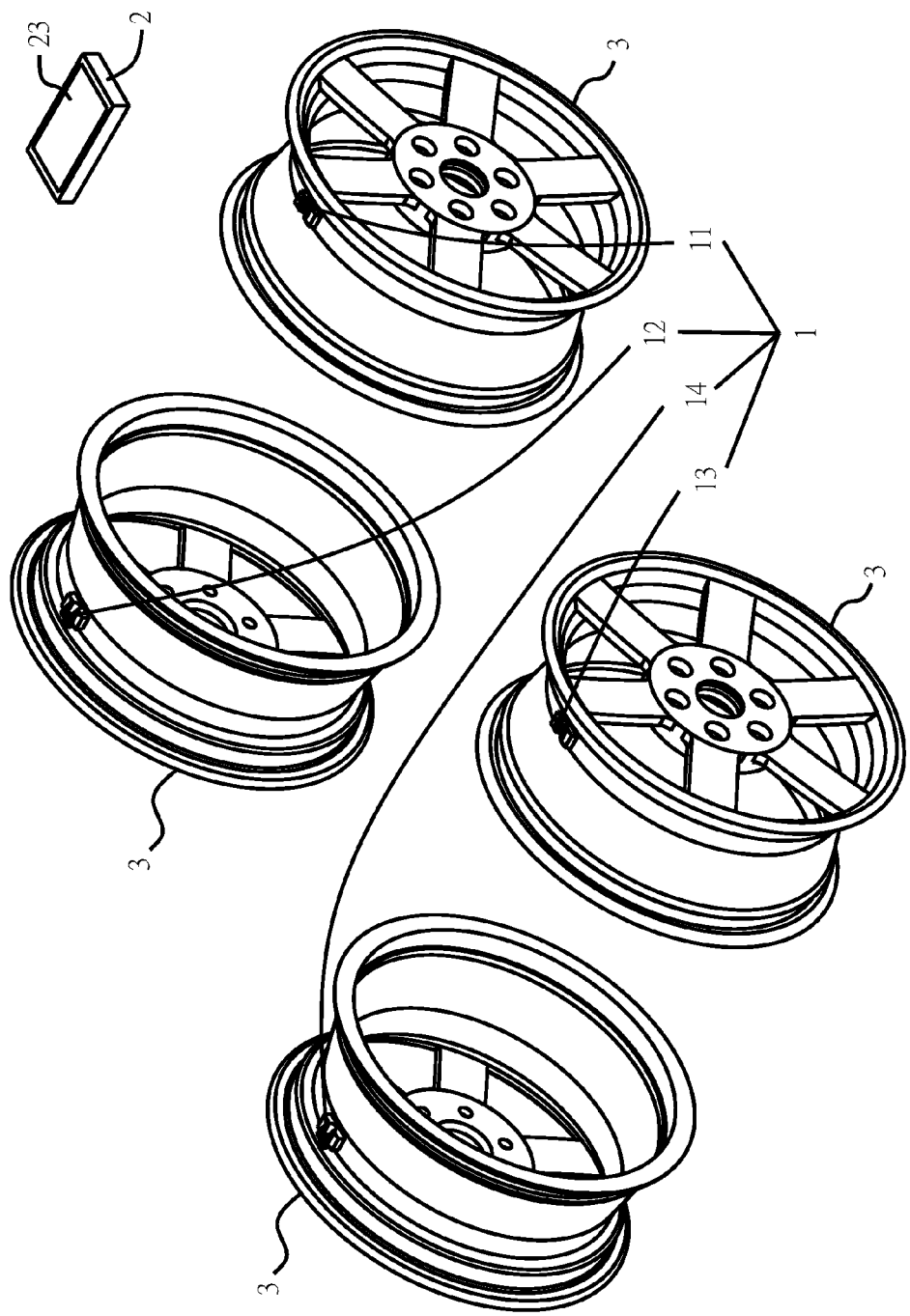
FIG. 1 is a schematic diagram according to one embodiment of the present invention illustrating a main controller and four transmitters embedded on the wheels of a vehicle.

The invention disclose herein provides for a method and system for a tire pressure monitoring system (TPMS). Specifically, the present invention is comprised of the following steps (a) to (f):

(a) pair one main controller with multiple transmitters, with each transmitter installed on each of the wheels of a vehicle. Each transmitter has a serial number and a first micro-processing unit, which is electrically connected to the detection unit. The main controller has a second micro-processing unit, which is electrically connected to an operating unit, a display unit, and a vibration detection unit.

(b) the first micro-processing unit of the transmitter of the operating unit sends, through wireless transmission, a pairing signal to the second micro-processing unit of the main controller to perform a time pairing matching. The time pairing program provides each transmitter a corresponding, but unique time parameter, and each time parameter is assigned a different delay time.

(c) Each detection unit detects the tire condition of each corresponding tire. The vibration detection unit detects for vibration of the vehicle or the main controller. If vibration is detected, the vibration detection will transmit such vibration information through the transmitter to the second micro-processing unit of the main controller. The transmitter wireless transmits the vibration information by delaying the time interval to conserve the time parameter of each transmitter, thereby preventing any overlap.

(d) When the second micro-processing unit of the main controller receives information that a tire condition is abnormal, synchronized recording of the vehicle velocity information is activated. The second micro-processing unit receives the vibration warning signal from the vibration detection unit and sends vibration warning signal to the display unit. Furthermore, the vibration warning signal is transmitted to a mobile device, which will also display the vibration warning signal.

(e) At a predetermined time, the main controller will perform a synchronization between the main controller and the transmitters. Specifically, the second micro-processing unit sends out, via wireless transmission, a synchronization signal that delays the time interval according to the time parameter of each transmitter.

(f) In accordance with the timing parameter of each transmitter, the tire condition of each tire is wireless transmitted in sequence to the second micro-processing unit to the display unit for display.

The present invention is effective in preserving the velocity of the vehicle when abnormal tire condition is detected. The synchronized recording of the tire conditions and the vehicle velocity information will be preserve for future access if necessary, such as in the event of traffic accident. Additionally, the detection of abnormal tire pressure condition will also trigger the detection for the presence of abnormal vibration. If abnormal vibration is detected, the second micro-processing unit of the main controller will send out a vibration warning signal to the display unit for display in order to notify the driver. The vibration warning signal will also be sent via wireless transmission to the mobile device as well. Accordingly, the driver will be notified of any abnormal tire conditions and repair or replace the tires, thereby effectively reducing problems and accidents due to poor tire condition.

DETAILED DESCRIPTIONS OF THE DRAWINGS

The present invention relates to a sequence encoding functions of a tire information wireless sensing devices and methods. The main technical characteristics, purpose and effectiveness will be clearly presented to the embodiments described below:
1 Transmitter
101 first micro-processing unit
1011 first memory unit
102 detection unit
103 high frequency transmitter unit
104 low frequency receiver unit
11 first transmitter
12 second transmitter
13 third transmitter
14 fourth transmitter
2 main controller
21 second micro-processing unit
211 second memory unit
22 operating unit
23 display unit
24 low frequency transmitter unit
25 high frequency receiver unit
26 vibration detection unit
261 control switch
27 master wireless transceiver unit
3 rim
4 remote controller
41 mobile device
42 remote transceiver unit The following drawings are in accordance with one embodiment of the present invention of a method and system for tire pressure monitoring system with wireless tire condition sensing device and warning mechanism. Other features of the present invention will be made clear with reference to the following steps (a) through (f) and the drawings.

Figure 2:
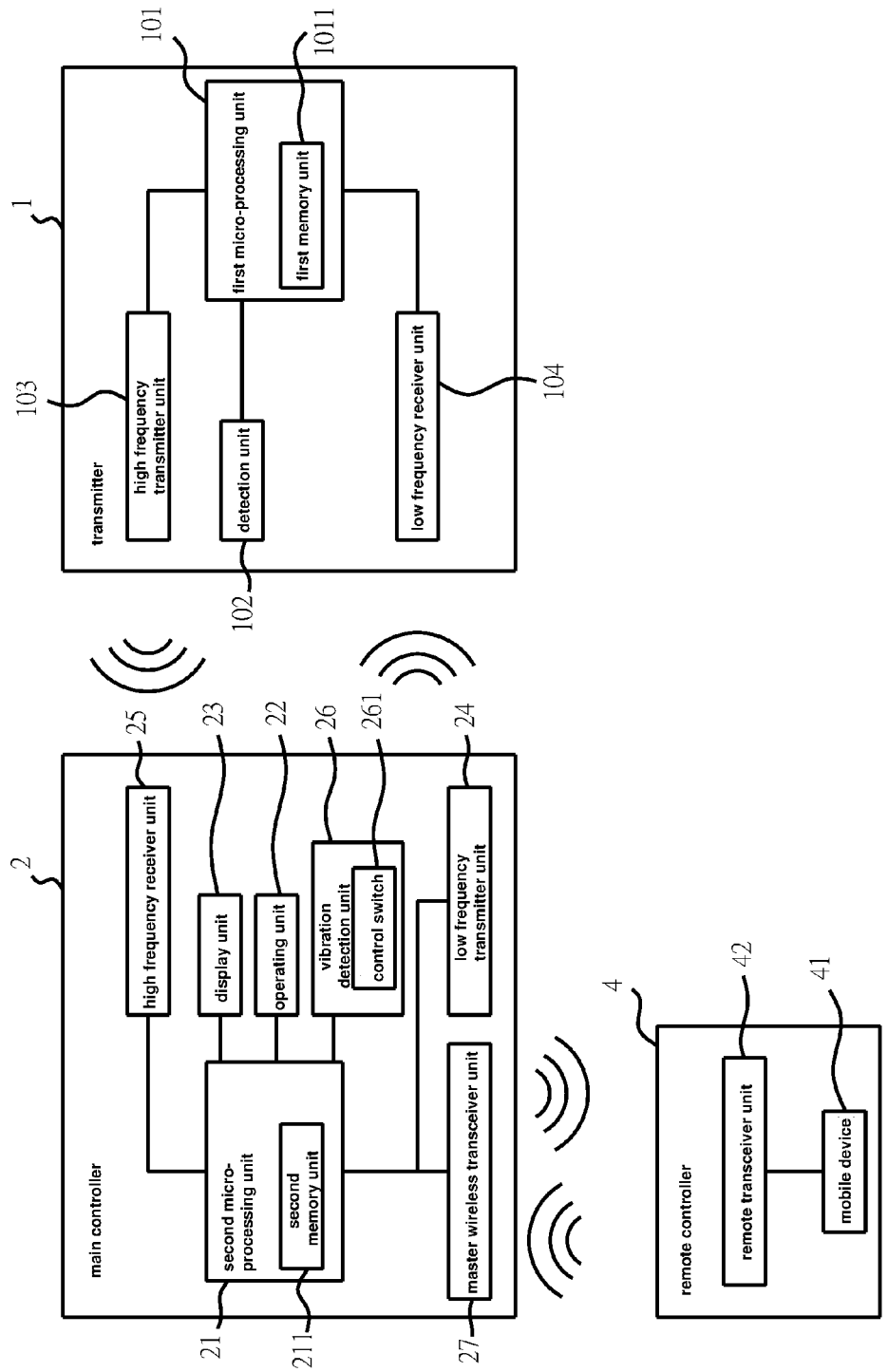
FIG. 2 is a schematic block diagram according to one embodiment of the present invention illustrating the interaction between the controller and the transmitters.

Referring to FIGS. 1 and 2, step (a) of the present invention includes a plurality of transmitters (1), a main controller (2), and a remote controller (4). The transmitters (1) are mounted on the rims (3) of a vehicle. Each transmitter (1) has a serial number. Each transmitter (1) has a first micro-processing unit (101), and each first micro-processing unit (101) which is electrically connected to a detection unit (102). Each first micro-processing unit is electrically connected to a high frequency transmitter unit (103). Each first micro-processing unit is electrically connected to a low frequency receiver unit (104). The first micro-processing unit (101) has a first memory unit (1011). More specifically, a vehicle should include at least four tires with a corresponding transmitter (1) for each tire.

Referring to FIG. 1, for ease of explanation, the transmitters (1) are defined as first transmitter (11), second transmitter (12), third transmitter (13), and fourth transmitter (14). Initially, the first transmitter (11) is set with a serial number such that it is the first transmitter in the series, the second transmitter (12) is set with a serial number such that it is the second transmitter in the series, the third transmitter (13) is set with a serial number such that it is the third transmitter in the series, and the fourth transmitter (14) is set with a serial number such that it is the fourth transmitter in the series. The first transmitter (11), second transmitter (12), third transmitter (13), and fourth transmitter (14) individually detects the tire conditions of one of the four tires of the vehicle. The tire conditions include tire pressure data, temperature data, centrifugal data, and battery voltage information.

Referring to FIG. 2, the main controller (2) has a second micro-processing unit (21), which is electrically connected to the operating unit (22) of the second micro-processing unit (21). The second micro-processing unit (21) of the main controller (2) is electrically connected to the low frequency transmitter unit (24) of the second micro of the second micro-processing unit (21). The second micro-processing unit (21) of the main controller (2) is electrically connected to high frequency receiver unit (25) of the second micro of the second micro-processing unit (21). The second micro-processing unit (21) of the main controller (2) is electrically connected to vibration detection unit (26) of the second micro of the second micro-processing unit (21).

The second micro-processing unit (21) of the main controller (2) is electrically connected to master wireless transceiver unit (27) of the second micro of the second micro-processing unit (21). The second micro-processing unit (21) also has a second memory unit (211) which can manually switch on or off the operation of the system.

Furthermore, the remote controller (4) has a mobile device (41), and it is electrically connected to the remote transceiver unit (42) of the mobile device (41). The remote transceiver unit (42) and the master wireless transceiver unit (27) of the main controller (2) are connected via Bluetooth wireless communicate technology.

Still referring to FIG. 2, in step (b), an operating unit (22) transmits through the first micro-processing unit (101) of each transmitter (1) a pairing signal. The pairing signal is transmitted from the high frequency transmitter unit (103) and received by the high frequency receiver unit (25) of the main controller (2), where the pairing signal is transmitted to the second micro-processing unit (21) of the main controller (2) in order to perform a pairing sequence. The time paring program provides each transmitter a corresponding, but unique, time parameter. The timing parameter is 1~N, N is a natural number. Each time parameter has a different delay time to avoid signal interference and overlapping problem. The time parameter is encoded in the second memory unit (211) of the main controller (2).

As an example, when the second micro-processing unit (21) of the main controller (2) sets the time parameter of the first transmitter (11) as "1" for a 1 second delay, the second micro-processing unit (21) of the main controller (2) will set the time parameter of the second transmitter (12) at "2" for a 2 second delay; the second micro-processing unit (21) of the main controller (2) will set the time parameter of the third transmitter (13) at "3" for a 3 second delay; the second micro-processing unit (21) of the main controller (2) will set the time parameter of the fourth transmitter (14) at "4" for a 4 second delay. The timing parameter number determines the length of time of the delay, and the larger the timing parameter number, the longer the length of time of the delay. Each timing parameter is transmitted by the low frequency transmitter unit (24) of the main controller (2), and the timing parameter is received by the low frequency receiver unit (104) of each of the transmitters (1) and is received by the first memory unit (1011) of the corresponding transmitters (1).

Notably, when a vehicle is in motion, every transmitter (1) will switch from a power-saving state or "standby" mode to "operating" mode. When the transmitters (1) are in "operating" mode, each of the transmitters (1) will read from the corresponding first memory unit (1011) to obtain the corresponding time parameters and time delay in order to delay the timing accordingly.

Still referring to FIG. 2, in step (c), each detection unit (102) detects the tire condition of the vehicle and its tires, and the vibration detection unit (102) concurrently detects the vehicle and the main controller (2) to determine whether there is vibration. Then, according to the time parameter of each transmitter (1), the synchronization signal will delay the time interval to ensure that the transmitters are in sync and the time parameters are being conserved. Thereafter, the tire information will be sent via the high frequency transmitter unit (104) and received by the high frequency receiver unit (25) of the main controller (2), and be stored in the second micro-processing unit (21).

In addition, if the vibration detection unit (102) detects vibration in the vehicle or the main controller (2), vibration information will be sent via the high frequency transmitter unit (104) and received by the high frequency receiver unit (25) of the main controller (2). The vibration information is further sent to the second micro-processing unit (21). Notably, according to the time delay described above, one second after activation, the first transmitter (11) will transmit the detection signal to main controller (2). Two seconds after activation, the second transmitter (12) will transmit the detection signal to main controller (2). Three seconds after activation, the third transmitter (13) will transmit the detection signal to main controller (2). Four seconds after activation, the fourth transmitter (14) will transmit the detection signal to main controller (2). This effectively prevents clock rate or clock frequency errors as a result of signal overlap, and therefore, allows the main controller to accurate receive the signals emitted by each of the transmitters.

Continuing to refer to FIG. 2, in step (d), If the second micro-processing unit (21) of the main controller (2) detects abnormal tire condition, the vehicle velocity information will be recorded in the second memory unit (211). The vehicle velocity information is not limited to acceleration information. For example, the acceleration can be zero while the velocity information is recorded.

When the second micro-processing unit (21) receive the vibration information from the vibration detection unit (26), the second micro-processing unit (21) will determine the "on" or "off" status of the control switch (261) of the vibration detection unit (26). If the control switch (261) is determined to be "on" then the second micro-processing unit (21) will control the display unit (23) to display a vibration warning for display to the driver. Furthermore, the driver is able to download and install a companion mobile application "App" onto a mobile device (41) and set the vibration display warning. Therefore, if the driver steps away form the vehicle and the control switch (261) is "on," then the second micro-processing unit (21) will also control the master wireless transceiver unit (27) to transmit a wireless vibration warning to the remote transceiver unit (42) of the mobile device (41). The mobile application will perform the following functions: the mobile device (41) will display the vibration warning and control the speaker of the mobile device (41) to provide audible warning signal of the vibration. This is useful when abnormal tire condition or flat tire caused vibration while the vehicle is stationary. This is also useful when someone is attempting to steal the vehicle causing vibration to the main controller (2), wherein the driver is notified through the mobile device (41) and is able to timely notify the appropriate authorities.

On the other hand, if the driver does not want to receive vibration warning when the driver is away from the vehicle, the driver is able to turn the control switch (261) off before stepping away from the vehicle. The driver is also able to turn off notification from the mobile device (41) after stepping away from the vehicle. In this case, upon receiving vibration information from the vibration detection unit (26), the second micro-processing unit (21) will determine the vibration detection unit (26) to be "off," and will not control the display unit (23) to display the vibration warning and will also not control the master wireless transceiver unit (27) to display audible vibration warning signal to the mobile device (41).

Still referring to FIG. 2, in step (e), the main controller (2) will perform a synchronization with the transmitters (1). Specifically, the second micro-processing unit (21) of the main controller will send out a synchronization signal through the law frequency transmitter unit (24) of the main controller (2), and received by the low frequency receiver unit (104) and further transmitted to the first micro-processing unit (101) of each transmitter (1) for reset. Notably, time parameter can be stored in the main controller (2), thereby allowing the main controller (2) to perform the synchronization as needed. In addition, the driver can manually use the operating unit (22) to operate the main controller (2) to perform the synchronization.

Figure 3:
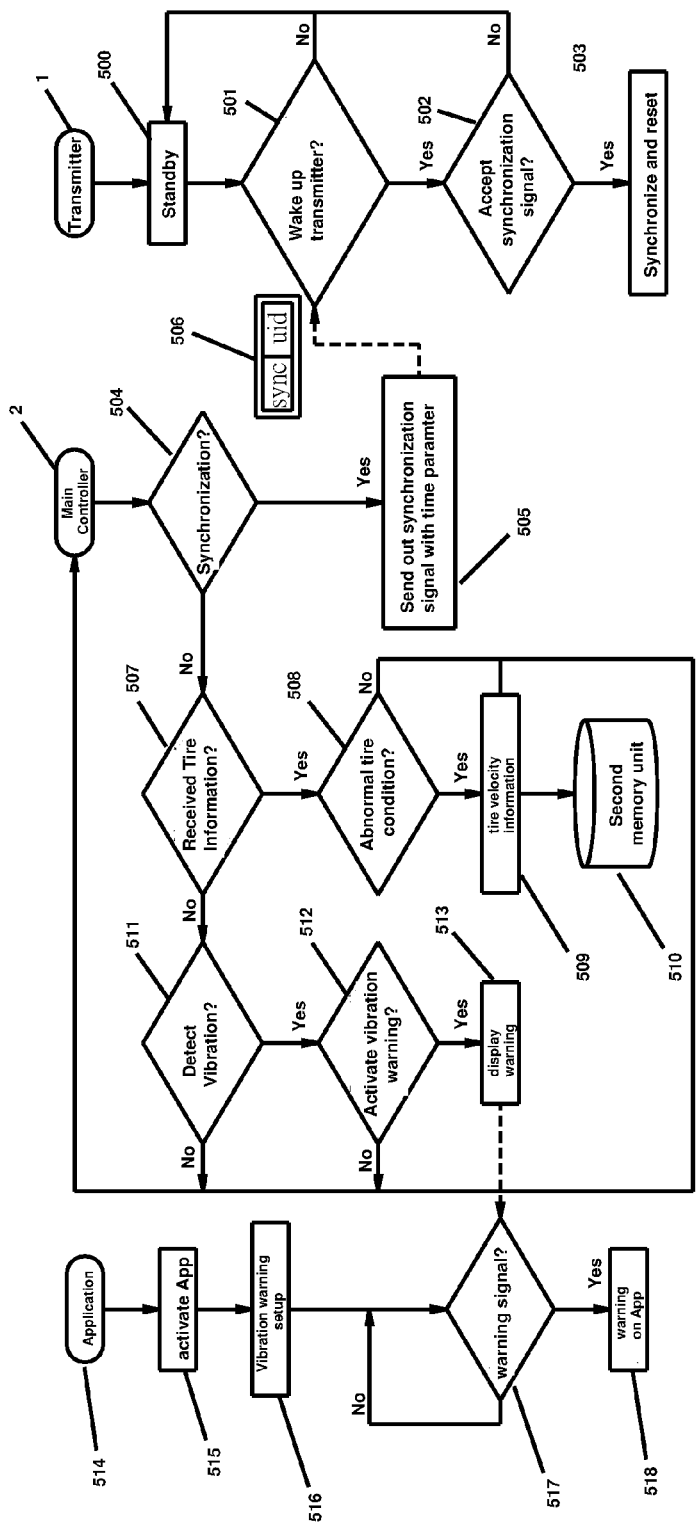
FIG. 3 is a schematic flow diagram according to one embodiment of the present invention.

Still referring to FIG. 3, in step (f), according to the time parameter of each transmitter (1), the synchronization signal will delay the time interval to ensure that the transmitters (1) are in sync and the time parameters are being conserved. Thereafter, the tire information will be sent via the high frequency transmitter unit (103) and received by the high frequency receiver (25) of the main controller (2), and be stored in the second micro-processing unit (21) for display by the display unit (23).

More specifically, the main controller (2) will send out a synchronization signal, and once the transmitters (1) are in synch, they will enter into standby mode in order to conserve energy. Furthermore, once reset, the transmitters (1) will send sequentially, according to their timing parameter, the tire condition of the corresponding tires. The tire condition information is transmitted by the high frequency transmitter unit (103) and received by the high frequency receiver unit (25), and further transmitted to the second micro-processing unit (21) for display by the display unit (23). Therefore, this effectively prevents clock rate or clock frequency errors as a result of signal overlap, and therefore, allows the main controller to accurate receive the signals emitted by each of the transmitters.

Accordingly, the method and system for tire pressure monitoring system with wireless tire condition sensing device and warning mechanism as disclosed by the present invention disclosed herein not only can effectively prevents clock rate or clock frequency errors as a result of signal overlap, the main controller (2) is also able to more accurately obtain the detected information.

Also, when abnormal tire condition is detected, the system is also able to concurrently record the vehicle velocity information, thereby preserving such data for future use. In addition, the vibration detection unit (26) can detect the vehicle or the main controller (2) for any vibration. Once any vibration is detected as a result of abnormal tire condition or tire ruptures or as a result of attempted theft of the vehicle causing the main controller (2) to vibrate, the vibration detection unit (26) will send out a vibration warning signal to the second micro-processing unit (21) of the main controller (2) for display by the display unit (23) and allowing the driver to take appropriate action.

At the same time, the vibration warning signal can also be transmitted to the mobile device (41). As such, the driver can be warned of any vibration as a result of abnormal tire condition or tire rupture while the vehicle is stationary. Furthermore, if abnormal vibration is detected on the main controller (2), the driver can perform maintenance or replace the tires as necessary, thereby reducing traffic accidents and prevent serious bodily injury and preventing theft of the vehicle.

Referring to FIG. 3 for a flow diagram summarizing the present invention, wherein the transmitters (1) is initially in standby mode (500) and will wake up (501) if it receive signal from the main controller (2) or return to standby mode (500). Then, the transmitters (1) will either accept or reject the received synchronization signal (502). If the synchronization signal (502) is rejected, the transmitters (1) will return to standby mode (500); if the synchronization signal is accepted, the transmitters (1) will synchronize and reset (503).

The main controller (2) will first determine whether synchronization (504) of the transmitters (1) is required. If synchronization (504) is required, the main controller (2) will send out the synchronization signal with time parameter (505) to the transmitters (1). The synchronization signal (506) will synch the transmitters (1) according to the transmitters (1) corresponding serial or identification number.

If synchronization (504) is not required, the main controller determine if any tire condition information (507) is received. If tire condition information is received, then the main controller determine whether there is any abnormal tire condition (508). If there is no abnormal tire condition, the main controller (2) returns to its initial state. If there is abnormal tire condition, the tire velocity information (509) is recorded and saved in the second memory unit (510).

If no tire information is received (507), the main controller determine if any vibration information is received (511). If no vibration information is received, the main controller (2) returns to its initial state. If vibration information is received, the main controller (2) determines whether to activate the vibration warning (512). If no vibration warning is not required, the main controller (2) returns to its initial state. If vibration warning is required, the vibration warning signal is sent to the display (513).

The driver or user can install a corresponding application (514), which can be activated (515) and used to setup vibration warning (516) to receive vibration warning. Then, the application determines if a warning signal is required (517). If a vibration warning was displayed (513), a vibration warning signal is sent to the application and is displayed (518). If there is no vibration warning, the application returns to a loop until there is a warning signal.

I claim:

1. A method for monitoring tire pressure comprising
   a. providing a main controller wherein said main controller is comprised of a second micro-processing unit, a second memory unit, a first receiver unit, a display unit, an operating unit, a control switch, a second transmitter unit, and a master wireless transceiver unit;
   b. providing one or more tire transmitter wherein said tire transmitter is comprised of a first micro-processing unit, a first memory unit, a second receiver unit, a first transmitter unit, a second receiver unit, and a first detection unit;
   c. having said first micro-processing unit transmit a pairing signal via said first transmitting unit to said second micro-processing unit via said first receiver unit;
   d. performing a matching process on said pairing signal wherein said matching process is comprised of assigning a first time interval to said pairing signal;
   e. storing said pairing signal to said second second memory unit;
   f. transmitting said pairing signal back to said first micro-processing unit via said second transmitting unit to said second micro-processing unit via said second receiver unit at and storing pairing signal to said first memory unit;
   g. obtaining at least one data point of a tire by said first detection unit;
   h. transmitting said data point of a tire by said first micro-processing unit via said first transmitting unit to said second micro-processing unit via said first receiver unit at said time of transmission;
   i. synchronized retrieval and storing at least one data point of a vehicle by said main controller at second memory unit via said second micro-processing unit upon detecting said data point of a tire meeting one or more predetermined criterion.

2. The method of claim 1 wherein said data point of a vehicle comprised of vehicle velocity.

3. The method of claim 1 wherein said data point of a vehicle comprised of vehicle acceleration.

* * * * *